United States Patent
Meduvsky et al.

(10) Patent No.: US 6,789,820 B2
(45) Date of Patent: Sep. 14, 2004

(54) VARIABLE OUTPUT INFLATOR

(75) Inventors: Alex G. Meduvsky, Romeo, MI (US); Matthew C. Frank, Rochester Hills, MI (US); Arnold J. Herberg, Davisburg, MI (US); Joseph J. Zwolinski, Warren, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 1 day.

(21) Appl. No.: 10/180,744

(22) Filed: Jun. 26, 2002

(65) Prior Publication Data

US 2004/0000777 A1 Jan. 1, 2004

(51) Int. Cl.[7] .............................................. B60R 21/26
(52) U.S. Cl. ...................................... 280/742; 280/736
(58) Field of Search ................................ 280/736, 737, 280/741, 742

(56) References Cited

U.S. PATENT DOCUMENTS 5,639,117 A * 6/1997 Mandzy et al. .............. 280/741
6,036,226 A    3/2000 Brown et al. ............... 280/736
6,039,347 A * 3/2000 Maynard .................... 280/736
6,279,952 B1 * 8/2001 Van Wynsberghe et al. ..... 280/777

* cited by examiner

Primary Examiner—Charles T. Jordan
Assistant Examiner—Kimberly S. Smith
(74) Attorney, Agent, or Firm—Tarolli, Sundheim, Covell & Tummino L.L.P.

(57) ABSTRACT

An apparatus (10) includes an inflatable vehicle occupant protection device (14) and an inflation fluid source (50) for providing inflation fluid (152) for inflating the protection device. The apparatus (10) also includes an opening (170) through which the inflation fluid (152) flows from the inflation fluid source (50). A member (190) is movable to control flow of the inflation fluid (152) through the opening (170). A volume of a field responsive fluid (230) resists movement of the member (190). The field responsive fluid (230) has a viscosity that varies in response to an energy field acting on the fluid. The apparatus (10) further includes means (232) for varying the viscosity of the field responsive fluid (230) to vary the resistance to movement of the member (190).

16 Claims, 3 Drawing Sheets

VARIABLE OUTPUT INFLATOR

TECHNICAL FIELD

The present invention relates to an inflator for inflating an inflatable vehicle occupant protection device, such as an air bag. More particularly, the present invention relates to an inflator having a variable output.

BACKGROUND OF THE INVENTION

It is known to inflate an inflatable vehicle occupant protection device to help protect a vehicle occupant. The protection device is inflated by inflation fluid from an inflator. One particular type of inflatable vehicle occupant protection device is an air bag that may be steering wheel mounted or dash mounted. Upon the occurrence of an event for which occupant protection is desired, the air bags are inflated into a position between an occupant of the vehicle and the vehicle steering wheel and/or dash to help protect the vehicle occupant.

It is known to tailor the flow rate of the inflation fluid provided by an inflator in order to inflate an inflatable vehicle occupant protection device in a predetermined manner. For example, it is known to vary the pressure to which the inflatable vehicle occupant protection device is inflated in accordance with factors such as crash severity and the size, weight, and/or position of the occupant. Also, it is known to vary inflation fluid flow rate to help control the rate at which an inflatable vehicle occupant protection device is inflated and to help control the length of time that the device remains inflated. Known inflators accomplish this through the use of one or more ignitable pyrotechnic charges that can burn for predetermined periods of time and/or in a predetermined sequence.

SUMMARY OF THE INVENTION

An apparatus includes an inflatable vehicle occupant protection device and an inflation fluid source for providing inflation fluid for inflating the protection device. The apparatus also includes an opening through which the inflation fluid flows from the inflation fluid source. A member is movable to control flow of the inflation fluid through the opening. A volume of a field responsive fluid resists movement of the member. The field responsive fluid has a viscosity that varies in response to an energy field acting on the fluid. The apparatus further includes means for varying the viscosity of the field responsive fluid to vary the resistance to movement of the member.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF AN EMBODIMENT OF THE INVENTION

Figure 1:
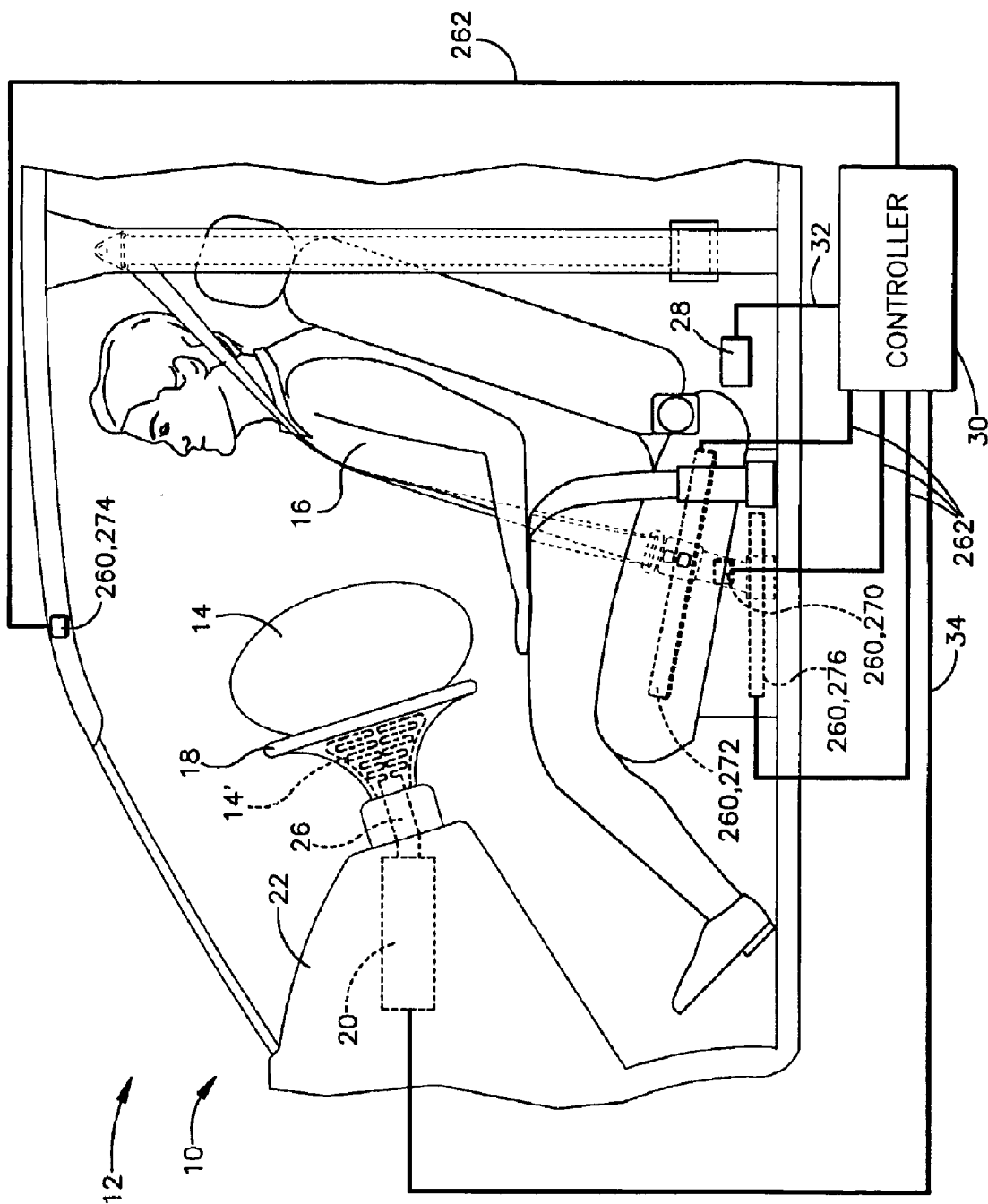
FIG. 1 is a schematic view of an apparatus for helping to protect an occupant of a vehicle, according to an embodiment of the present invention.

The present invention relates to an apparatus for helping to protect an occupant of a vehicle. As representative of the present invention, FIG. 1 illustrates schematically an apparatus 10 for helping to protect an occupant 16 of a vehicle 12. In the embodiment illustrated in FIG. 1, the apparatus 10 includes an inflatable vehicle occupant protection device in the form of an air bag 14. Other actuatable vehicle occupant protection devices that can be used in accordance with the invention include, for example, side impact air bags, side curtains, inflatable seat belts, inflatable knee bolsters, and inflatable head liners.

More specifically, the present invention relates to an inflator for inflating an inflatable vehicle occupant protection device. The present invention is applicable to various inflator constructions. As representative of the present invention, in the embodiment illustrated in FIG. 1, the apparatus 10 includes an inflator 20 for providing inflation fluid for inflating the air bag from a deflated and stored condition illustrated at 14' to an inflated condition illustrated at 14.

In the embodiment illustrated in FIG. 1, the air bag 14 is mounted in a steering wheel 18 of the vehicle 12. The air bag 14 could, however, be mounted in an alternative location. For example, a passenger side air bag (not shown) may be mounted in a dash or instrument panel 22 of the vehicle 12. The inflator 20 is connected in fluid communication with the air bag 14 by known means 26, such as a manifold or a conduit. The inflator 20 could, however, be connected directly to the air bag 14.

The vehicle 12 also includes a vehicle condition sensor, indicated schematically at 28, that is operative to detect a vehicle condition, such as a collision, for which occupant protection is desired. The sensor 28 is operatively connected to a controller 30 by lead wires 32. The controller 30 is operatively connected to the inflator 20 by lead wires 34. Upon detecting a predetermined vehicle condition, the vehicle condition sensor 28 provides a signal to the controller 30 via the lead wires 32. The controller 30 is operative to determine whether to actuate the inflator in response to the sensed condition. If inflation is desired, the controller 30 provides a signal to the inflator 20 via the lead wires 34 to actuate the inflator. In an alternative configuration, the vehicle condition sensor 28 may be connected directly to the inflator 20. In this instance, the vehicle condition sensor 28 would provide a signal directly to the inflator 20 to actuate the inflator.

The inflator 20, when actuated, provides inflation fluid to the air bag 14. Upon actuation of the inflator 20, the air bag 14 moves from the deflated and stowed condition illustrated at 14' to the inflated condition illustrated at 14. The air bag 14, when in the inflated condition, helps protect the vehicle occupant 16.

Figure 2:
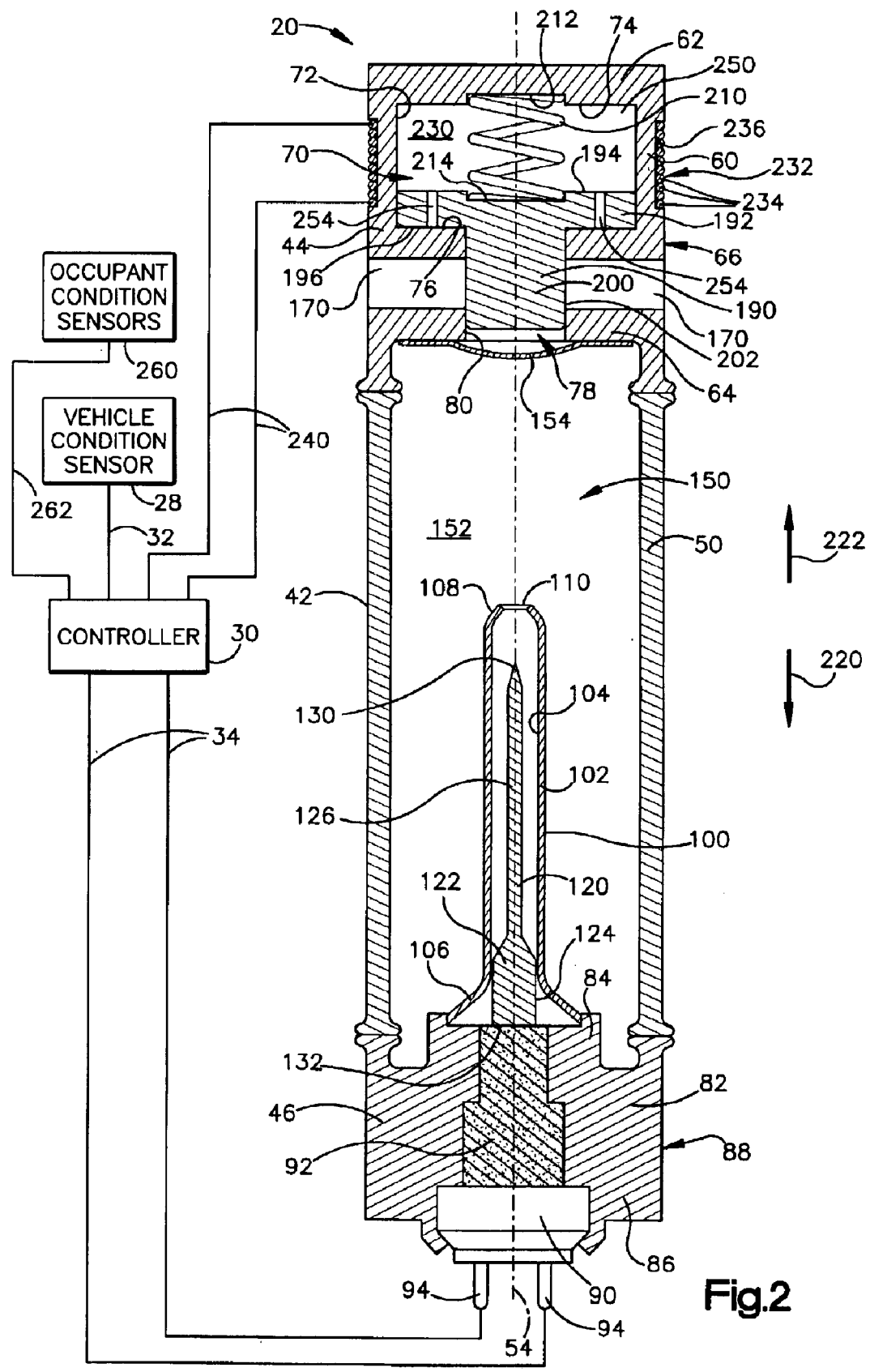
FIG. 2 is a schematic view of a variable output inflator of the apparatus of FIG. 1 in an unactuated condition.
Figure 3:
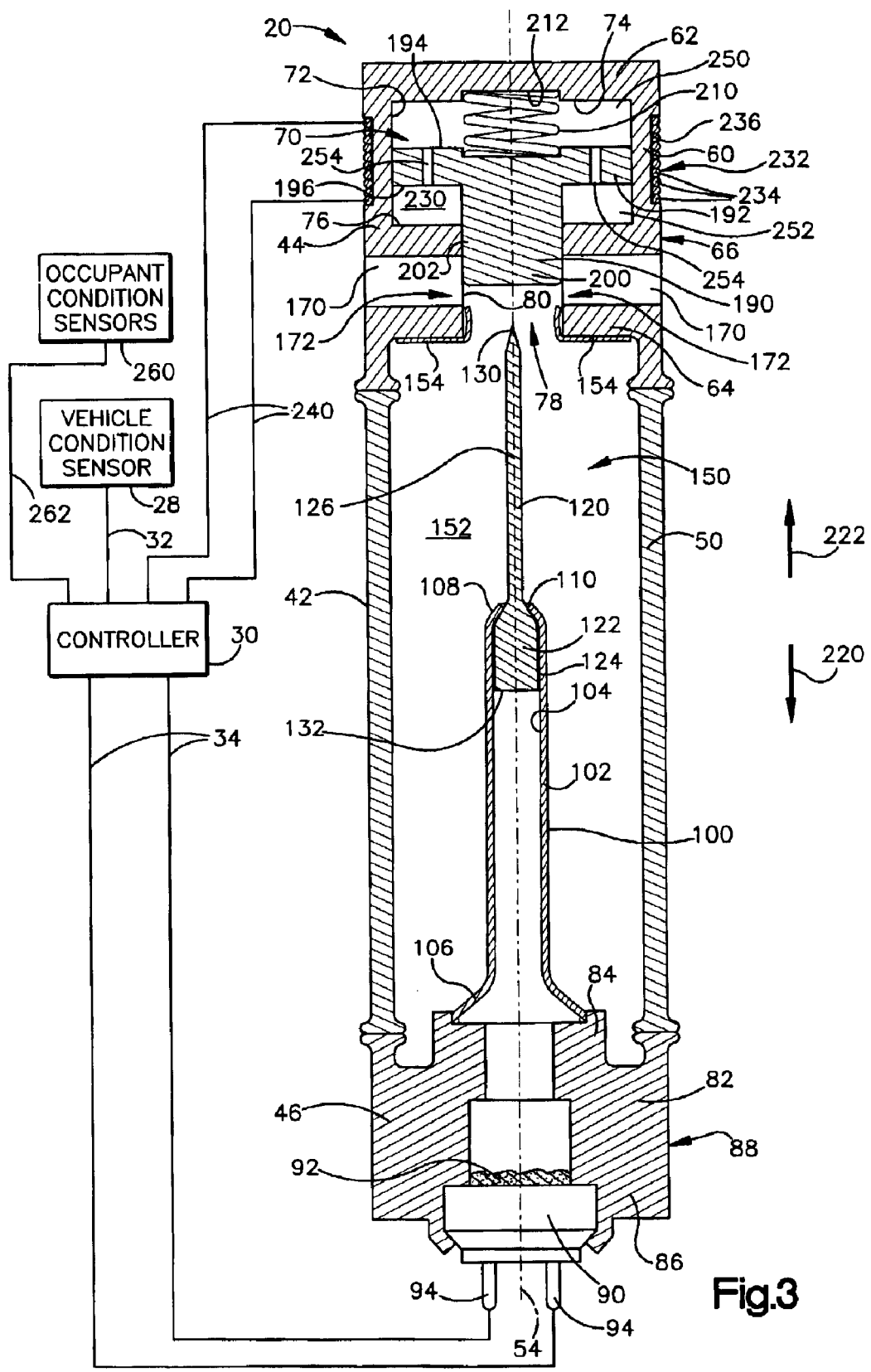
FIG. 3 is a schematic view of the variable output inflator of the apparatus of FIG. 2 in an actuated condition.

Referring to FIGS. 2 and 3, the inflator 20 has a generally elongate configuration. The inflator 20 includes a main body portion 42, an outlet cap 44, and an end cap 46. The main body portion 42 has a tubular, cylindrical configuration including an axially extending, cylindrical side wall 50 centered on a longitudinal central axis 54 of the inflator 20. The outlet cap 44 is secured to a first open end of the main body portion 42. The end cap 46 is secured to a second open end of the main body portion 42, opposite the outlet cap 44. The outlet cap 44 and the end cap 46 are secured to the main body portion 42 by known means such as a weld (e.g., friction weld, laser weld, inertia weld). The outlet cap 44 and the end cap 46 could also be secured to the main body portion 42 by alternative means, such as brazing or screw threads.

The outlet cap 44 has a generally cylindrical configuration including a cylindrical side wall 60 extending between opposite top and bottom walls 62 and 64, respectively. The side wall 60 has a generally cylindrical outer surface 66. The outlet cap 44 includes a cylindrical central chamber 70 partially defined by a cylindrical side wall 72 centered on the axis 54. The central chamber 70 is further defined by an upper end wall 74 formed by a lower surface of the top wall 62, and an opposite lower end wall 76 formed by an upper surface of the bottom wall 64. A cylindrical central passage 78 extends along the axis 54 from the lower end wall 76 of the central chamber 70 through the bottom wall 64. The central passage 78 is defined by a cylindrical side wall 80 having a diameter that is smaller than the diameter of the side wall 72 of the central chamber 70.

The end cap 46 has a generally cylindrical configuration including a cylindrical side wall 82 extending between opposite top and bottom end portions 84 and 86, respectively. The side wall 82 has a generally cylindrical outer surface 88. The end cap 46 supports an initiator 90, such as a squib. The initiator 90 includes a body of pyrotechnic material 92 and a pair of electrical leads 94 that extend from the bottom end portion 86 of the end cap 46.

The end cap 46 also includes a guide sleeve 100 that extends along the axis 54 from the top end portion 84 of the end cap. The guide sleeve 100 has a generally cylindrical side wall 102 that includes a generally smooth cylindrical inner surface 104. A first end 106 of the guide sleeve 100 is connected to the top end 84 of the end cap 46. A second end 108 of the guide sleeve 100, opposite the first end 106, has a tapered configuration and terminates with an opening 110.

The guide sleeve supports a projectile 120 that has a generally elongated configuration centered on and extending along the axis 54. The projectile 120 includes a cylindrical piston 122 having an outer surface 124 that forms a close fit with the inner surface 104 of the side wall 102. The projectile 120 also includes a lance 126 that extends from an upper end of the piston 122 and terminates with a pointed tip 130. The projectile 120 is slidable in the guide sleeve along the axis 54. When the inflator 20 is in the unactuated condition of FIG. 2, a lower end 132 of the piston 122 is positioned adjacent the initiator 90.

When the inflator 20 is in the assembled condition of FIGS. 2 and 3, the bottom wall 64 of the outlet cap 44 and the top end of the end cap 46 are presented towards the main body portion 42. The main body portion 42, outlet cap 44, and end cap 46 define a gas storage chamber 150 of the inflator 20. The gas storage chamber 150 contains a quantity of inflation fluid 152 in the form of compressed gas. A rupturable burst disk 154 is secured to a lower surface of the bottom wall 64 and blocks flow of inflation fluid 152 out of the gas storage chamber 150. In the embodiment illustrated in FIGS. 2 and 3, the inflator 20 is a stored gas inflator free from pyrotechnic material for generating inflation fluid. The inflation fluid may consist essentially of an inert gas, such as helium.

The outlet cap 44 includes at least one inflation fluid outlet passage 170 extending radially through the bottom wall 64, from the central passage 78 to the outer surface 66 of the side wall 60. The outlet cap 44 may include a plurality of these radially extending outlet passages 170. The embodiment of FIGS. 2 and 3 illustrates two such outlet passages 170. The outlet passages 170 provide fluid communication between the central passage 78 and the means 26 (FIG. 1) for providing fluid communication between the inflator 20 and the air bag 14. The central passage 78 is in fluid communication with the gas storage chamber 150 when the inflator 20 is in the actuated condition (FIG. 3), i.e., when the burst disk 154 is ruptured. The outlet passages 170 thus enable flow of inflation fluid 152 from the gas storage chamber 150 through the central passage 78 to the air bag 14.

The outlet cap 44 supports a piston 190 that is slidable in the outlet cap along the axis 54. The piston 190 includes a generally disc-shaped head portion 192 having an upper surface 194 and an opposite lower surface 196. The head portion 192 is positioned in the central chamber 70 and is slidable along the axis 54 in the central chamber.

The piston 190 also includes a cylindrical plunger 200 extending from the lower surface 196 of the head portion along the axis 54. The plunger 200 is positioned at least partially in the central passage 78 and is slidable along the axis 54 in the central passage. The plunger 200 has an outer surface 202 that forms a close fit with the side wall 80 of the central passage 78.

The outlet cap 44 also supports a spring 210 or other suitable biasing means in the central chamber 70. The spring 210 has a first end positioned against the upper end wall 74 of the central chamber 70. In the embodiment illustrated in FIGS. 2 and 3, a first end of the spring 210 is received in a recess 212 in the upper end wall 74. The spring 210 has a second end positioned against the upper surface 194 of the head portion 192 of the piston 190. In the embodiment illustrated in FIGS. 2 and 3, the second end of the spring 210 is received in a recess 214 in the upper surface 194 of the head portion 192.

The spring 210 biases the piston 190 in a downward first direction indicated by the arrow labeled 220 in FIGS. 2 and 3. When the inflator 20 is in the unactuated condition of FIG. 2, the spring 210 biases the piston 190 such that the lower surface 196 of the head portion 192 is in abutting engagement with the lower end wall 76 of the central chamber 70. When the inflator 20 is in the actuated condition of FIG. 3, the piston 190 is urged against the bias of the spring 210 in an upward second direction, indicated by the arrow labeled 222, opposite the first direction. This causes the head portion 192 to move away from the lower end wall 76 of the central chamber 70.

The central chamber 70 contains a volume of a magnetorheological fluid, hereinafter referred to as an MR fluid 230. The MR fluid 230 is a fluid having a viscosity that can be varied by applying a magnetic field to the fluid. The viscosity of the MR fluid 230 can be varied by controlling the strength of the magnetic field applied to the fluid.

The outlet cap 44 also includes a coil 232 that has a plurality of windings 234. The windings 234 extend around the outer surface 66 of the side wall 60 of the outlet cap 44. In the embodiment illustrated in FIGS. 2 and 3, the windings are positioned in a recess 236 formed in the side wall 60. The coil 232 encircles the central chamber 70 and, thus, the MR fluid 230. The windings 234 are electrically connected to the controller 30 via lead wires 240. The windings 234, when energized by an electric current provided via the lead wires 240, generate a magnetic field which acts on the MR fluid 230.

The head portion 192 of the piston 190 divides the central chamber 70 into an upper portion 250 and a lower portion 252 (FIG. 3). A plurality of openings in the form of orifices 254 are formed in the head portion 192 of the piston 190. The orifices 254 establish fluid communication through the head portion 192 between the upper portion 250 and the lower portion 252.

The MR fluid 230 resists axial sliding movement of the piston 190 in the central chamber 70. If the viscosity of the MR fluid 230 is low enough, the fluid in the central chamber 70 can flow through the orifices 254 in the head portion 192 of the piston 190. This enables the piston 190 to move axially in the central chamber 70 through the body of MR fluid 230, along the axis 54. If the viscosity of the MR fluid 230 is high enough, the MR fluid in the central chamber 70 cannot flow through the orifices 254 in the head portion 192 of the piston 190, and axial sliding movement of the piston in the central chamber is blocked. Varying the viscosity of the MR fluid 230 thus varies the rate of flow of the MR fluid through the orifices 254, and thereby varies the resistance to movement of the piston 190 in the central chamber 70 along the axis 54.

In addition to the vehicle condition sensor 28, the vehicle 12 may include one or more occupant condition sensors of several known types. Such occupant condition sensors are illustrated schematically at 260 in FIGS. 2 and 3. The occupant condition sensors 260 are operative to sense conditions such as the position of the driver in the vehicle, the size and/or weight of the driver, and seat belt tension. As shown in FIG. 1, the occupant condition sensors 260 may include seatbelt tension sensors 270, seat weight sensors 272, occupant position sensors 274, and seat position sensors 276. The occupant condition sensors 260 are operative to provide condition data via lead wires 262.

The controller 30 incorporates one of several algorithms known in the art for determining whether to actuate the inflator 20. In the event of a condition involving sudden vehicle deceleration or other event for which protection of the vehicle occupant may be desired, the occupant condition sensors 260 and the vehicle condition sensor 28 provide appropriate output signals to the controller 30. The controller 30 uses these output signals in a known manner to determine whether to actuate the inflator 20. For example, the controller 30 may compare the output signals of the sensors 24 and 260 with outputs found in a look-up table.

Upon sensing a vehicle condition for which occupant protection is desired, the vehicle condition sensor 28 is operative to cause actuation of the inflator 20. Referring to FIGS. 2 and 3, the vehicle condition sensor 28 provides a signal to the controller 30 via the lead wires 32. Upon receiving the signal from the vehicle condition sensor 28, the controller 30 actuates the inflator 20 via the lead wires 34. The signal is provided to the initiator 90 via the leads 94 and is operative to cause ignition of the pyrotechnic material 92. Alternatively, the vehicle condition sensor 28 could provide a signal directly to the initiator 90 to actuate the inflator 20.

When the initiator 90 is actuated, combustion products from the ignited pyrotechnic material 92 act on the piston portion 122 to propel the projectile 120 along the guide sleeve 100 from the position of FIG. 2 to the position of FIG. 3. This causes the tip 130 of the lance 126 to pierce and rupture the burst disk 154. It will be appreciated that the dimensions of the projectile 120 and the guide sleeve 100 may be designed such that the tapered end portion 108 of the guide sleeve engages the piston 122 at the end of its travel and helps prevent the lance 126 from contacting the piston 190.

Those skilled in the art will appreciate that the inflator 20 may include a variety of alternative means for rupturing the burst disk 154. For example, the inflator 20 may include a pyrotechnic initiator similar to the initiator 90 that is configured such that its combustion products act on the burst disk to rupture the burst disk. As a further example, the inflator 20 may include any suitable means for rupturing the burst disk.

When the burst disk 154 is ruptured, the fluid pressure of the inflation fluid 152 acting on the burst disk 154 causes the burst disk to move or petal away towards or into the central passage 78 as illustrated in FIG. 3. Also, when the burst disk 154 is ruptured, the piston 190, particularly the plunger 200, is exposed to the inflation fluid pressure in the gas storage chamber 150. The inflation fluid pressure urges the piston 190 in the second direction 222, against the bias of the spring 210 and the resistance provided by the MR fluid 230. The fluid pressure of the inflation fluid 152 is sufficient to overcome the bias of the spring 210 and move the piston in the second direction 222. According to the present invention, however, the fluid pressure of the inflation fluid 152 may or may not be sufficient to overcome the resistance provided by the MR fluid 230. This depends on the viscosity of the MR fluid 230.

If the viscosity of the MR fluid 230 is low enough, the fluid pressure of the inflation fluid 152 overcomes the bias of the spring 210 and the resistance provided by the MR fluid and the piston 190 moves in the second direction 222. As the piston 190 moves in the second direction 222, the MR fluid 230 flows through the orifices 254 from the upper portion 250 of the central chamber 70 to the lower portion 252. If the viscosity of the MR fluid 230 is high enough, the MR fluid cannot flow through the orifices 254 and movement of the piston 190 in the second direction 222 is blocked.

The axial position of the plunger 190 in the central passage 78 helps to determine the fluid flow rate of the inflation fluid 152 provided by the inflator 20. When the inflator 20 is in the unactuated condition of FIG. 2, the plunger 200 blocks fluid communication between the outlet passages 170 and the central passage 78. As the piston 190 moves in the second direction 222, fluid communication between the outlet passages 170 and the central passage 78 is established via an opening 172. The cross-sectional area of the opening 172 varies depending on the position of the plunger 200 in the central passage 78. In general, as the piston 190 moves in the second direction 222, the cross-sectional area of the opening 172 increases. As the piston 190 moves in the first direction 220, the cross-sectional area of the opening 172 decreases.

According to the present invention, the viscosity of the MR fluid 230 is varied in order to vary the rate of flow of the MR fluid through the orifices 254. By varying the viscosity of the MR fluid 230, the resistance to movement of the piston 190 in the second direction 222 is varied. The viscosity of the MR fluid 230 may thus be adjusted to control the rate at which the cross-sectional area of the opening 172 is increased. The viscosity of the MR fluid 230 may also be adjusted to maintain the opening 172 at a desired cross-sectional area.

Those skilled in the art will appreciate that it may be desirable to adjust the rate at which the inflation fluid 152 is provided by the inflator 20, depending on sensed vehicle and occupant conditions. According to the present invention, the controller 30 adjusts the viscosity of the MR fluid 230 to meet these objectives. The controller 30 controls the amount of energy supplied to the coil 232 to vary the viscosity of the MR fluid 230 in response to the outputs of the occupant condition sensors 260 and the vehicle condition sensor 28. The controller 30 may thus control the amount of inflation fluid provided by the inflator 20 responsive to the vehicle conditions (e.g., crash severity) sensed by the vehicle condition sensor 28. The controller 30 may also control the amount of inflation fluid provided by the inflator 20 responsive to the conditions (e.g., size, weight, position, and/or seat belt tension) sensed by the occupant condition sensors 260.

In the event of a condition for which occupant protection is desired, the vehicle condition sensor 28 and the occupant condition sensors 260 provide appropriate output signals to the controller 30. According to the present invention, the controller 30 adjusts the viscosity of the MR fluid 230 in accordance with these output signals. The controller 30 determines how to adjust the viscosity of the MR fluid 230 by known means, such as a look-up table.

For example, upon the occurrence of a relatively low severity event for which occupant protection is desired, the occupant 16 will have a relatively low amount of kinetic energy to be absorbed by the air bag 14. Therefore, the air bag 14 may be inflated to a relatively low-pressure inflated condition and still absorb most or all of the kinetic energy of the occupant. To achieve this result, upon detection of such an occurrence, the controller 30 may be adapted to cause the strength of the magnetic field generated by the coil 232 to be relatively high. This relatively high magnetic field strength causes the MR fluid 230 to have a high viscosity, and thus increase the resistance to movement of the piston 190. As a result, the cross-sectional area of the opening 172 may be maintained relatively small or may be increased at a relatively low rate. This would cause the inflation fluid 152 to flow from the inflator 20 at a relatively low rate, and the air bag 14 would thus be inflated to a low-pressure inflated condition.

In the event of relatively high severity event for which occupant protection is desired, the occupant 16 will have a relatively high amount of kinetic energy to be absorbed by the air bag 14. Therefore, the air bag 14 may be inflated to a relatively high-pressure inflated condition to absorb the kinetic energy of the occupant. To achieve this result, upon detection of such an occurrence, the controller 30 may be adapted to cause the strength of the magnetic field generated by the coil 232 to be relatively low or zero. This low magnetic field strength causes the MR fluid 230 to have a low viscosity, and thus reduces the resistance to movement of the piston 190. As a result, the cross-sectional area of the opening 172 may be maintained relatively large or may be increased at a relatively high rate. This would cause the inflation fluid 152 to flow from the inflator 20 at a relatively high rate, and the air bag 14 would thus be inflated to a high-pressure inflated condition.

The controller 30 also may determine whether to change the viscosity of the MR fluid 230 on the basis of conditions sensed by the occupant condition sensors 260. The sensed conditions may include the position of the occupant, the size and/or weight of the occupant, and seat belt tension.

For example, the occupant condition sensors 260 may determine that the occupant is in a forward seating position or that the occupant is below a predetermined weight. In this instance, the controller 30 may respond to these sensed conditions by raising the viscosity of the MR fluid 230 to increase the resistance to movement of the piston 190. This would cause the inflation fluid 152 to flow from the inflator 20 at a relatively low rate, and the air bag 14 would thus be inflated to the low-pressure inflated condition.

Similarly, the occupant condition sensors 260 may determine that the occupant is in a rearward seating position or that the occupant is above a predetermined weight. In this instance, the controller 30 may respond to these sensed conditions by lowering the viscosity of the MR fluid 230 to reduce the resistance to movement of the piston 190. This would cause the inflation fluid 152 to flow from the inflator 20 at a relatively high rate, and the air bag 14 would thus be inflated to the high-pressure inflated condition.

Vehicle and occupant conditions can change during the duration of a sensed event in ways that would make it desirable to change the output flow rate of the inflator 20. The present invention is advantageous in that the viscosity of the MR fluid 230 can be changed within a very short period of time, for example, in a few milliseconds. The vehicle condition sensor 28 and the occupant condition sensors 260 are operative to sense changing conditions during the sensed event, and the controller 30 is operative to adjust the viscosity of the MR fluid 230 accordingly during the event. For example, the viscosity of the MR fluid 230 may be increased to maintain a particular inflation fluid flow rate from the inflator 20. As another example, the viscosity of the MR fluid 230 may be decreased to increase the inflation fluid flow rate from the inflator 20. The inflation fluid flow rate can thus be varied during the duration of the crash event, instead of just at the onset of the crash event, to adjust the protection being provided to the occupant 16.

From the above description of the invention, those skilled in the art will perceive improvements, changes and modifications. For example, the present invention has been illustrated and described herein as relating to a stored gas inflator. Those skilled in the art will appreciate, however, that the present invention may also relate to types of inflators known in the art as solid propellant and augmented or hybrid inflators. In such configurations, the outlet cap 44 would be used in a similar or identical manner to control the flow of inflation fluid from the inflator. Such improvements, changes and modifications within the skill of the art are intended to be covered by the appended claims.

What is claimed is:

1. An apparatus comprising:
   an inflatable vehicle occupant protection device;
   an inflation fluid source that is actuatable for providing inflation fluid for inflating said inflatable vehicle occupant protection device, said inflation fluid source comprises a container including a storage chamber in which, prior to actuation of said inflation fluid source, is stored a gas under pressure, actuation of said inflation fluid source releasing said gas from said storage chamber;
   an opening through which said inflation fluid flows from said inflation fluid source;
   a member movable to control fluid flow through said opening, movement of said member being at least partially dependent upon a force exerted by said gas, which was released from said storage chamber, upon said member;
   a volume of a field responsive fluid for resisting movement of said member, said field responsive fluid having a viscosity that varies in response to an energy field acting on said field responsive fluid; and
   means for varying the viscosity of said field responsive fluid to vary the resistance to movement of said member.

2. An apparatus as set forth in claim 1 wherein said means for varying the viscosity of said field responsive fluid comprises a device for generating a magnetic field acting on said field responsive fluid, said field responsive fluid comprising a magneto-rheological fluid having a viscosity that varies in response to a change in said magnetic field.

3. An apparatus as set forth in claim 2 wherein said means for varying the viscosity of said field responsive fluid further comprises at least one occupant condition sensor operative to sense a condition and to provide a first output signal, and a controller for receiving said first output signal and controlling said magnetic field in response to said first output signal to control the resistance to movement of said member provided by said field responsive fluid.

4. An apparatus as set forth in claim 2 wherein said device for generating a magnetic field comprises a coil extending around said field responsive fluid and a controller for controlling flow of electric current through said coil to vary said magnetic field.

5. An apparatus as set forth in claim 4 wherein said means for varying the viscosity of said fluid further comprises at least one occupant condition sensor operative to sense a condition and to provide a first output signal, and a controller for receiving said first output signal and controlling said magnetic field in response to said first output signal to control the resistance to movement of said member provided by said field responsive fluid.

6. An apparatus comprising:

an inflatable vehicle occupant protection device;

an inflation fluid source for providing inflation fluid for inflating said inflatable vehicle occupant protection device;

an opening through which said inflation fluid flows from said inflation fluid source;

a member movable to control fluid flow through said opening;

a volume of a field responsive fluid for resisting movement of said member, said field responsive fluid having a viscosity that varies in response to an energy field acting on said field responsive fluid;

means for varying the viscosity of said field responsive fluid to vary the resistance to movement of said member; and a chamber for containing said field responsive fluid, said member comprising a piston having a head portion disposed in said field responsive fluid in said chamber, said head portion including at least one orifice through which said field responsive fluid flows upon movement of said head portion in said chamber.

7. An apparatus as set forth in claim 6 wherein said chamber is defined by at least one wall that constitutes a cylinder, said head portion of said piston being slidable in said cylinder.

8. An apparatus as set forth in claim 6, wherein piston includes a plunger portion, said piston being movable to positions between a first position in which said plunger portion blocks said opening and prevents inflation fluid flow through said opening and a second position in which said plunger portion unblocks said opening and permits inflation fluid flow through said opening.

9. An apparatus as set forth in claim 8 wherein said means for varying viscosity is operative to control movement of said member to control the degree to which said plunger portion unblocks said opening and thereby to control flow of inflation fluid through said opening.

10. An apparatus as set forth in claim 6 wherein said means for varying the viscosity of said field responsive fluid comprises a device for generating a magnetic field acting on said fluid, said fluid comprising a magneto-rheological fluid having a viscosity that varies in response to a change in said magnetic field acting on said field responsive fluid.

11. An apparatus as set forth in claim 10 wherein said means for varying the viscosity of said field responsive fluid further comprises at least one occupant condition sensor operative to sense a condition and to provide a first output signal, and a controller for receiving said first output signal and controlling said magnetic field in response to said first output signal to control flow of said inflation fluid.

12. An inflator for providing inflation fluid for inflating an inflatable vehicle occupant protection device, said inflator comprising:

an inflation fluid source;

an opening through which said inflation fluid flows from said inflation fluid source;

a volume of a field responsive fluid having a viscosity that varies in response to an energy field acting on said field responsive fluid;

a member movable to positions between a first position in which said member blocks said opening and a second position in which said opening is unblocked by said member; and means for varying the viscosity of said field responsive fluid to vary the resistance to movement of said member in said field responsive fluid and thereby to vary the degree to which said member unblocks said opening.

13. An apparatus comprising:

an inflatable vehicle occupant protection device;

an inflation fluid source for providing inflation fluid for inflating said inflatable vehicle occupant protection device;

an opening through which said inflation fluid flows from said inflation fluid source;

a member movable to vary the cross-sectional area of said opening;

a volume of a field responsive fluid for resisting movement of said member, said field responsive fluid having a viscosity that varies in response to an energy field acting on said field responsive fluid; and means for varying the viscosity of said field responsive fluid to vary the resistance to movement of said member and to control said cross-sectional area of said opening.

14. An apparatus as set forth in claim 13 wherein said inflation fluid source comprises a container including a storage chamber in which, prior to actuation of said inflation fluid source, is stored a gas under pressure, actuation of said inflation fluid source releasing said gas from said storage chamber, said gas that is released from said storage chamber exerting a force on said member for increasing said cross-sectional area of said opening.

15. An apparatus as set forth in claim 13 wherein said means for varying the viscosity of said field responsive fluid comprises a device for generating a magnetic field acting on said field responsive fluid, said field responsive fluid comprising a magneto-rheological fluid having a viscosity that varies in response to a change in said magnetic field.

16. An apparatus as set forth in claim 15 wherein said means for varying the viscosity of said field responsive fluid further comprises at least one occupant condition sensor operative to sense a condition and to provide a first output signal, and a controller for receiving said first output signal and controlling said magnetic field in response to said first output signal to control the resistance to movement of said member provided by said field responsive fluid.

* * * * *